Patented Mar. 9, 1943

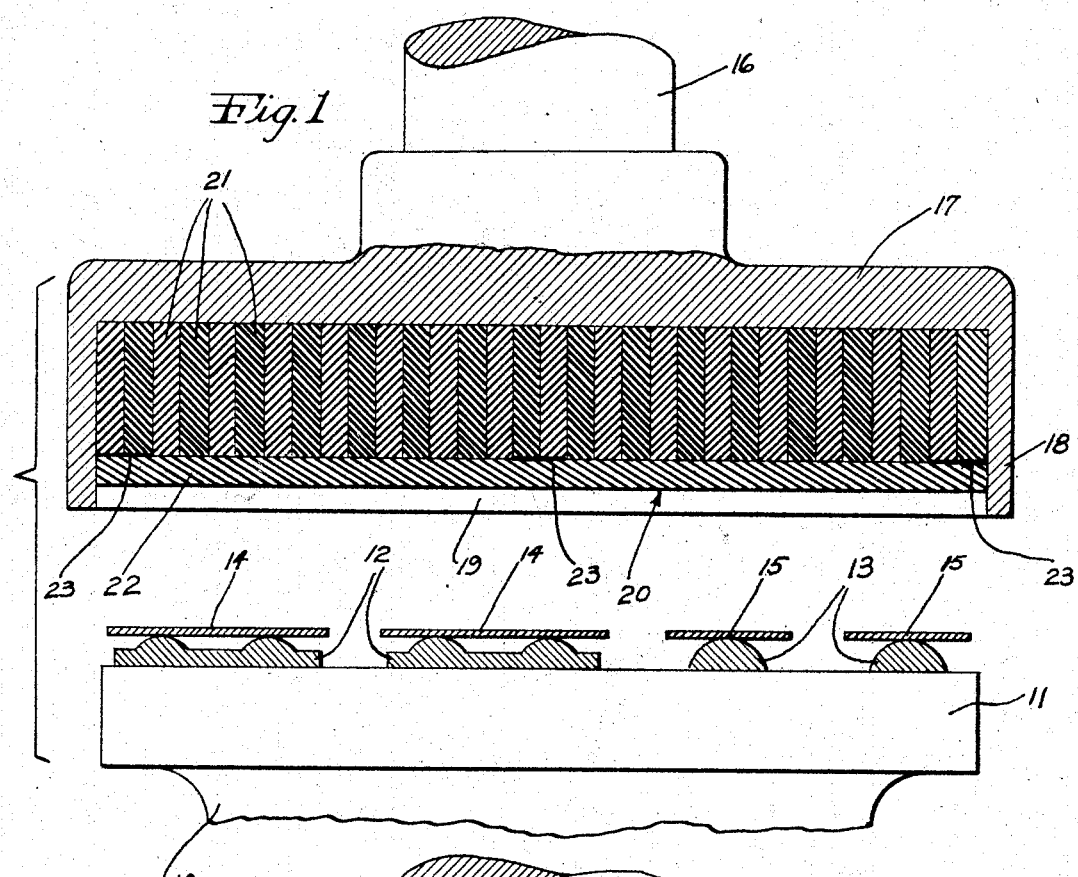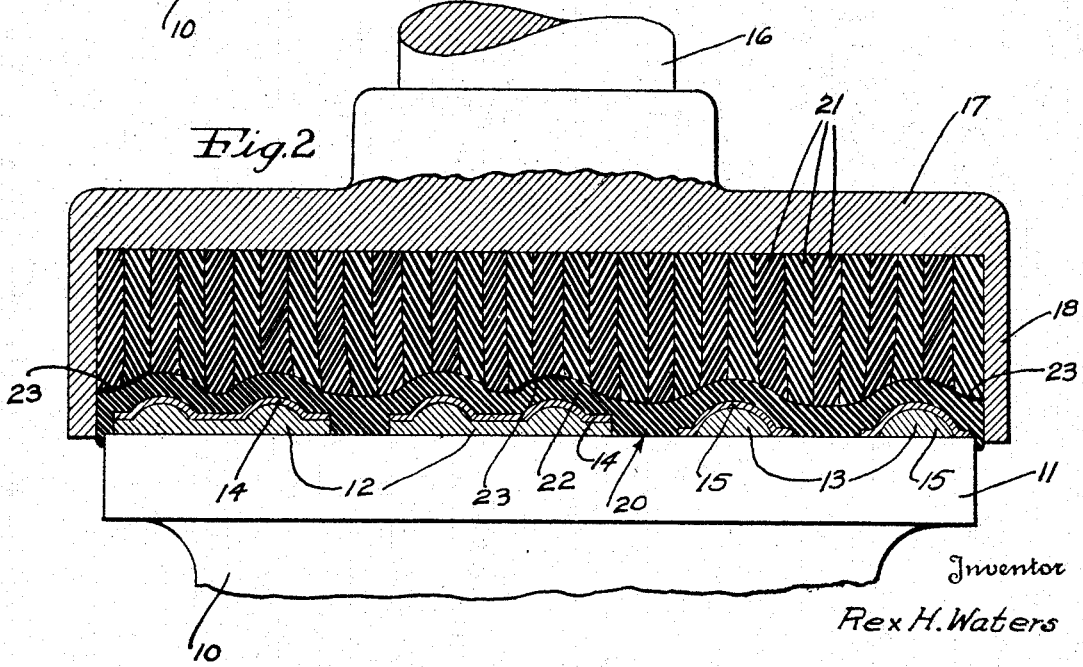

2,313,689

UNITED STATES PATENT OFFICE 2,313,689

RUBBER PRESS PAD

Rex H. Waters, Akron, Ohio, assignor to Wingfoot Corporation, Wilmington, Del., a corporation of Delaware Application January 9, 1941, Serial No. 373,779

2 Claims. (Cl. 113—44)

This invention relates to improvements in yieldable and resilient press pads or platens, constructed of rubber or similar material, which are utilized in cutting and forming sheet metal into various shapes and contours by pressure of the yieldable pads or platens upon the sheet metal which is positioned over suitable dies or forming bodies.

In the past yieldable pads or platens of this general type have been constructed of vulcanized rubber of such large thick pieces that they have been inconvenient to handle and difficult to cure properly with uniform density. The cost of manufacture, replacement or repair of these prior art devices has been high due to the large size of the rubber blocks which have been used. The working surfaces of press pads of this type become cut and mutilated by coming in contact with sharp edges of various forms and have to be repaired or renewed after a comparatively short period of time.

An object of this invention is to eliminate the foregoing objections by forming the resilient pad or platen of a plurality of relatively thin slabs assembled in either spot-cemented or free contiguous relation in an up-ended vertical side-by-side arrangement and thereafter covering the entire operating surface of these vertically up-ended slabs with a horizontally disposed relatively thin protective slab which may be spot-cemented to the lower edges of the vertical up-ended slabs. The horizontally disposed protective cover slab prevents abrasion or cutting of the vertical slabs and will permit them to last indefinitely. By taking all the wear, the cover slab only will need to be repaired or replaced periodically, and this can be done without disturbing the entire assembly.

The vertical up-ended slabs are preferably made of very resilient yieldable rubber as compared with the cover slab. The cover slab is composed of rubber which is resilient but less yieldable and is constructed of a very tough abrasive-resisting compound and its resiliency and toughness must be of a degree necessary to form or cut the work and at the same time resist damage from the sharp edges with which it comes in contact.

The purpose of covering the up-ended vertical slabs with the tough cover slab is three-fold. First, in the forming or cutting operation the irregular surfaces of the body being formed presses into the yielding pad and might under certain circumstances tend to separate the vertical slabs (where no cover slab is used) thereby producing spaces between the slabs into which the material being formed would project, thereby tending to form imperfect articles. The protective cover slab will obviate the above-mentioned hazard.

The second purpose of the protective cover slab lies in the fact that by taking all the wear a much less expensive grade of material can be used in the vertical laminated slabs.

The third purpose of the protective cover slab is the valuable function that it can be readily replaced or repaired at relatively small cost when it becomes worn or mutilated through use without disturbing the remainder of the assembly.

Another object of this invention lies in the fact that by the use of thin laminated vertical slabs in an up-ended position, unlimited thickness of the resilient platen may be obtained, thus making it possible to form much larger bodies than has heretofore been possible, such as automobile fenders, etc. In the past, platens of this nature have been limited in this respect due to the fact that they have been formed of large thick pieces of rubber, the thickness of which is necessarily held to limits that are practical in curing a body of rubber that will have a uniform density. This limited depth of draw, while suitable for small bodies, is too limited to be of universal value for use of this kind.

Other objects and advantages of this invention will appear more fully from the following description which, taken in conjunction with the accompanying drawing, discloses one practical construction and operation of a preferred embodiment of the invention. In the drawing, Figure 1 illustrates the platens of a press in open position in which a flexible pad is associated with the upper platen; and Figure 2 illustrates the platens in closed position.

The apparatus utilizing this improved resilient platen is in the form of a power press which may be operated hydraulically or otherwise. The lower portion of the press is composed of a table or support 10, the top part of which presents the horizontal surface of a platen 11 upon which various shapes or forms 12 and 13 are positioned to form various objects from blanks of sheet metal 14 and 15 by the pressure of the improved resilient platen as will be described later. The upper portion of the press is composed of a power-operated ram 16 on the lower end of which is mounted a head 17. The head 17 is preferably of rectangular shape and provided with downwardly extending flanges 18 around its outer periphery, said flanges forming a cavity 19 in the under surface of the head in which the resilient platen 20 is housed.

The resilient platen is composed of relatively narrow strips 21 of resilient material, such as rubber or other material having the properties of being flowable but substantially incompressible. These narrow slabs are assembled on edge in a vertical face-to-face relationship, and for convenience in manufacture and handling they are preferably made of a thickness, say from one to four inches depending upon the size and type of press and facilities for manufacturing same, and are assembled in the press head 17 under sufficient compression to enable them to retain their position therein without the aid of cement or vulcanization.

When these laminated slabs 21 have been assembled in the cavity of the head 17, a blanket 22 of rubber or like material is positioned horizontally in the cavity 19 so as to completely cover the lower or exposed edges of the laminated vertical slabs. This blanket or cover slab 22 may be held in place by spot cementing to the vertical slabs 21 at appropriate spots, as shown at 23. The horizontal cover blanket is composed of very tough rubber or like material and will take all the wear and when it is desired to renew or repair same it can readily be removed without disturbing the remainder of the assembly by nearly dissolving the cement where it is spot cemented to the vertical slabs 21.

In operation, forms such as designated by the numerals 12 and 13 are positioned upon the lower platen 11 (see Figure 1) and pieces of sheet material 14 and 15 are placed over them. Then power is applied to the ram 16 which causes the head 17 containing the resilient platen 20 to move downward toward the lower platen 11 and as the resilient platen 20 contacts and starts to flow over the sheet metal blanks 14 and 15, the flanges 18 of the head 17 will telescope over the lower platen and thus keep the resilient platen confined in the cavity 19 by preventing lateral flow of the resilient material. Due to the fact that the rubber in the resilient platen is flowable but substantially non-compressible, it will force the metal blanks 14 and 15 about the forms 12 and 13 and cause said blanks to take the shape of the exposed surfaces thereof.

For some installations the wearing sheet or blanket 22 may be omitted, having the lower edges of the slabs 21 exposed to form the working face of the platen. With such an arrangement, any one or more of the slabs 21 may be repaired or replaced when desired.

Thus, it will be apparent that a resilient platen made in accordance with the foregoing description will give excellent results and be economical to manufacture and install. The relatively thin protective cover slab 22 will take all the wear and can be conveniently and economically replaced from time to time when necessary, thus saving time and expense by obviating the necessity of disturbing the vertical laminated assembly which will last indefinitely. An important advantage realized from the use of the relatively thin cover sheet 22, non-rigidly associated with the underlying yieldable slabs 21 and unconnected with rigid marginal members of the press, is that this sheet 22 "floats" with relative freedom both vertically and horizontally with respect to the pressure transmitting slabs and the contour face of the particular die employed to shape the sheet metal work piece. This "floating" characteristic enables the sheet 22 to envelope and conform itself to the contour of the said dies under the transmitted compression forces with resulting and harmless creepage with respect to the contour of the forming dies and the sheet material thereon. Obvious this ability to "float" and creep in accommodation to intense localized forces relieves these areas of the sheet within the zones of distorting stresses of destructive internal and shearing stresses, thus the surface in contact with a sheet to be contoured on the dies is not unduly stretched whereby "gaping" tears are reduced to the minimum, as contrasted with the inherent surface tension which, in conventional thick forming pad sheets, induces such destructive injuries at the positions of contact with abrupt changes in contour of the dies. The power losses in deforming the conventional thick slab are substantially eliminated by my improvement.

Although I have illustrated and described only one form of this invention, it will be understood that various changes and modifications can be made in arrangement and construction which be within the scope of the appended claims.

I claim:

1. A press platen of the class described comprising a rigid platen body having a cavity in one of its faces, a multiplicity of relatively thin resilient flowable slabs assembled in a compact laminated relationship in said cavity so that the laminations will be substantially perpendicular with respect to the bottom of the cavity in the face of the platen, and a cover slab of more durable resilient material placed over the laminated assembly to protect same from wear and injury and to constitute the working face of the platen.

2. A press platen of the class described comprising a rigid platen body having a cavity in its lower face, a multiplicity of relatively thin slabs of resilient rubber assembled in face-to-face relation in said cavity, the so-related faces of said slabs being substantially perpendicular to the bottom of said cavity, and a facing sheet of more durable cut-resistant rubber covering the lowermost edges of said multiplicity of slabs to protect the same from wear and injury and to constitute the working face of the platen.

REX H. WATERS.